June 22, 1943.  J. M. BUCKLEY ET AL  2,322,564

GAME APPARATUS

Filed Aug. 20, 1942

Inventors
James M. Buckley
Thomas F. Clarey

Patented June 22, 1943

2,322,564

UNITED STATES PATENT OFFICE 2,322,564

GAME APPARATUS

James M. Buckley and Thomas F. Clarey, Chicago, Ill., assignors to Club Aluminum Products Company, Chicago, Ill., a corporation of Delaware Application August 20, 1942, Serial No. 455,450

6 Claims. (Cl. 35—35)

This invention relates, in general, to game apparatus particularly adapted, though not necessarily limited in use, for educational purposes, and one of the objects of the same is to provide an improved apparatus of this character, which will not only be interesting and amusing in operation, but will also be instructive, in that it will serve as a stimulus to increase the vocabulary.

A further object is to provide an improved apparatus of this character, which will be simple and durable in construction, cheap to manufacture, and efficient and effective in operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating this invention, and in which—

Figure 1:
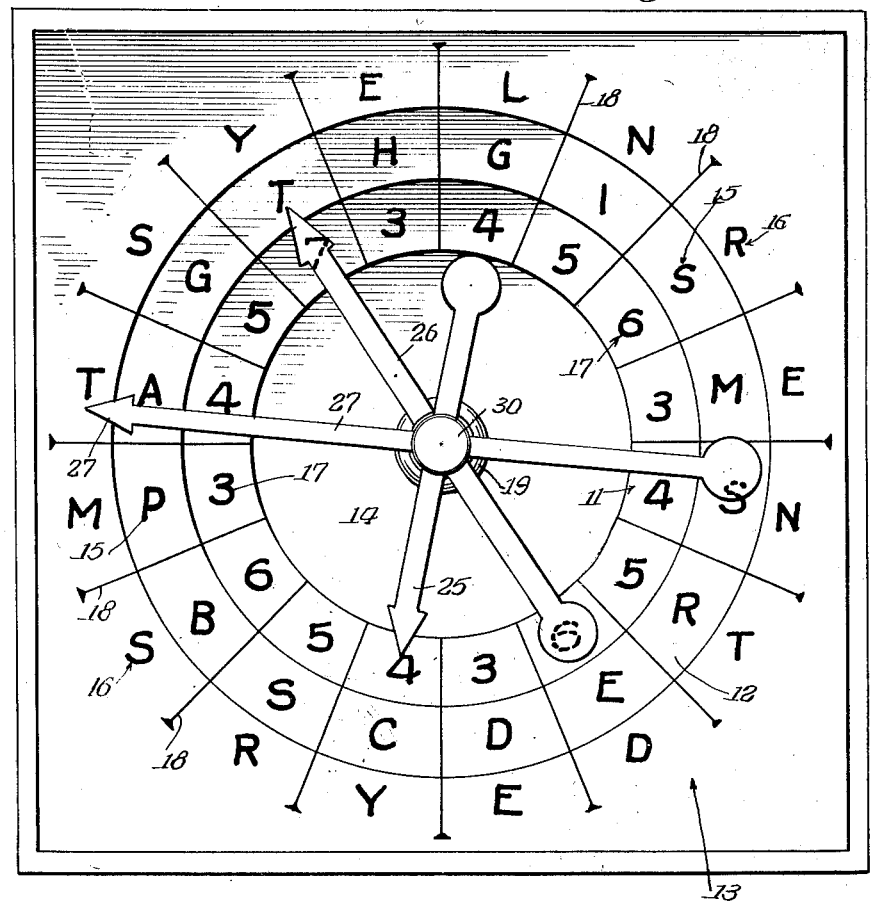
Fig. 1 is a top plan view of an apparatus of this character, constructed in accordance with the principles of this invention.

Referring more particularly to the drawing, the numeral 10 designates, generally, a board or body which may be constructed of any suitable material, and may be of any desired size and configuration.

One face of the board is shaped to form a plurality of steps 11, 12 and 13, arranged in different horizontal planes above a base portion 14, and these steps form areas or surfaces which are concentrically arranged about the base portion 14.

Arranged on the surfaces 12 and 13 are, respectively, a series of characters, preferably letters, 15, 16, and upon the surface 11 is another series of characters, 17, preferably different from the characters 15, 16, preferably in the form of numerals.

The characters on all of the surfaces are arranged preferably in groups, the various groups being separated by means of suitable radial dividing lines 18, to provide separate areas visible from the face of the board. These dividing lines 18 extend across each of the surfaces, so as to provide clearly defined areas, in which one of each of the characters of the series 15, 16 and 17 is located, so as to form groups. Obviously, the indicating characters may be arranged in any suitable manner, and the series on each of the surfaces may be arranged in any suitable position with relation to each other.

Mounted so as to project above the base portion 14, is an upright 19, which is preferably arranged at the diametric center thereof, and is encompassed by the surfaces 11, 12 and 13. This upright 19 may be permanently or removably secured to the board, and is provided with a series of reduced portions 20, 21 and 22, to form bearings, preferably of different diameters, to form shoulders 23—24.

Indicator members 25, 26, 27, preferably in the form of arms or pointers, are supported by the upright 19, each of the indicators loosely surrounding one of the bearing portions 20—21—22. Spacer members 28—29 are disposed between adjacent indicator members and respectively rest upon the shoulders 23—24 so as not to interfere with the free rotation of the indicators about the upright 19. These indicators are preferably of different lengths, and one is provided for each of the surfaces 11, 12 and 13, the length of the indicators being such that each will project over the particular surface containing the characters with which the respective indicators co-operate.

The indicators are mounted so that they may be freely rotated or spun about the upright 19, by striking the indicators to one side of the pivot thereof with the finger or an implement.

The indicators, the upright and the spacer members are held in assembled relation in any desired or suitable manner, preferably by means of a cap member 30 engaging the upper end of the upright and extending over the uppermost indicator, but out of contact with the indicator.

With this construction, it will be manifest that, inasmuch as the indicators are adapted to be freely spun about the upright, and as the indicating ends thereof project over the respective areas or surfaces 11, 12 and 13, and further, as the indicators are of different lengths, some of the indicators will come to rest in advance of the others, and will, when at rest, indicate a particular character or letter. By being independently supported, the rotation of one of the indicators will in no way affect the rotation of the other.

Figure 2:
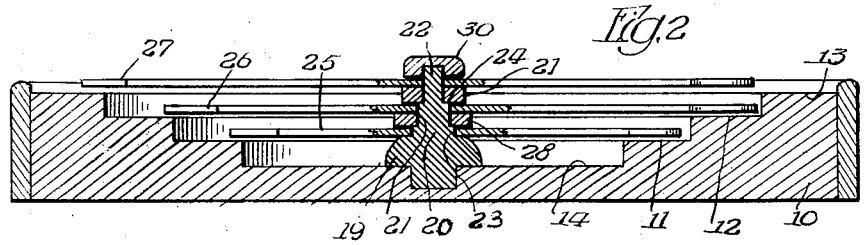
Fig. 2 is a vertical sectional view of Fig. 1, taken through all of the indicators or pointers, the latter being arranged in the same vertical plane.

In using the apparatus, and as a stimulus to increase the vocubulary, the indicators are all positioned in the same vertical plane, as shown in Fig. 2. They are then spun about the upright 19 by simultaneously striking them on one side of the pivot. After the spinning movement, and when the indicators come to rest, each of the indicating ends thereof will be disposed within one of the areas between the dividing lines 18.

As an example of the operation of this apparatus, and as shown in Fig. 1, the longer indicator, which co-operates with the area 13, indicates the letter "T." The next longer indicator also points to the letter "T" in another of the spaces between the lines 18, while the smaller, or lower, indicator indicates the numeral 4 on the surface 11 between two of the lines 18. In this position, the apparatus would indicate the suggestion of a 4-letter word that begins with "T" and ends with "T," such as "That."

The credits for such solutions and the manner of employing the apparatus will, of course, be governed by the rules of the game.

With this improved construction, it will be manifest that a very interesting game may be played, and, as above stated, with very good educational results.

The characters may be arranged in any suitable manner, and any desired characters suitable for the purpose may be employed. Obviously, either one of the indicators which co-operate with the surfaces or areas 12 and 13 may be designated as the one to indicate the letter which constitutes the beginning of the word.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A game apparatus embodying a board one face of which is provided with a plurality of steps encompassing a central portion thereof to provide spaces of different cross-sectional dimensions, the faces of said steps having thereon indicia, an upright encompassed by said steps, and a plurality of rotatable indicators mounted upon said upright for spinning movement, said upright being stepped to form supports individual to the said indicators, whereby each indicator will be free from the weight of the other indicators, said indicators being independent of each other in their movements, each of said indicators being individual to one of said faces.

2. A game apparatus embodying a board one face of which is provided with a plurality of steps encompassing a central portion thereof to provide spaces of different cross-sectional dimensions, the faces of said steps having thereon indicia, an upright encompassed by said steps, a plurality of rotatable indicators of different lengths mounted upon said upright for spinning movement, said upright being stepped to form supports individual to the said indicators, whereby each indicator will be free from the weight of the other indicators, and spacer members between adjacent indicators and also resting upon the respective supporting surfaces of said upright, said indicators being independent of each other in their movements, each of said indicators being individual to one of said faces.

3. A game apparatus embodying a board one face of which is provided with a plurality of steps encompassing a central portion thereof to provide spaces of different cross-sectional dimensions, the faces of said steps having thereon indicia, an upright encompassed by said steps, and a plurality of rotatable indicators mounted upon said upright for spinning movement, said upright being stepped to provide supporting surfaces for the respective indicators, the said surfaces being individual to and substantially in the same plane as the respective faces of said board, whereby the indicating end of said indicators will be maintained in close proximity to the respective said faces, said indicators being independent of each other in their movements, each of said indicators being individual to one of said faces, the pivots of said indicators being in the same vertical plane.

4. A game apparatus embodying a shaft, means for supporting said shaft against rotation, said shaft being stepped to provide spaced circumferential supports, game elements individual to said supports and mounted upon said shaft to freely rotate thereabout and with respect to each other, said elements being individual to said supports and each of said elements being free from the weight of the other rotatable elements, the size of the pivots of said elements and of the contacting area of the elements with their respective supports being different, whereby the resulting differences in friction may enhance the uncertainty of the stopping point of the elements with respect to each other, and means with which said elements co-operate to indicate indicia associated with said elements.

5. A game apparatus embodying a shaft, means for supporting said shaft against rotation, said shaft being stepped to provide spaced circumferential supports, game elements individual to said supports and mounted upon said shaft to freely rotate thereabout and with respect to each other, said elements being individual to said supports and each of said elements being free from the weight of the other rotatable elements, spacer members between adjacent game elements and also resting upon the respective said circumferential supports, the size of the pivots of said elements and of the contacting area of the elements with their respective spacer members being different, whereby the resulting differences in friction may enhance the uncertainty of the stopping point of the elements with respect to each other, and means with which said elements co-operate to indicate indicia associated with said elements.

6. A game apparatus embodying a shaft, means for supporting said shaft against rotation, said shaft being stepped to provide spaced circumferential supports, game elements individual to said supports and mounted upon said shaft to freely rotate thereabout and with respect to each other, said elements being individual to said supports and each of said elements being free from the weight of the other rotatable elements, the size of the pivots of said elements and of the contacting area of the elements with their supports being different, whereby the resulting differences in friction may enhance the uncertainty of the stopping point of the elements with respect to each other, and means with which said elements co-operate to indicate indicia associated with said elements, the said game elements varying in size with respect to each other.

JAMES M. BUCKLEY.
THOMAS F. CLAREY.